US008315175B2

(12) United States Patent
McDermott, III et al.

(10) Patent No.: US 8,315,175 B2
(45) Date of Patent: *Nov. 20, 2012

(54) ROUTER SWITCH FABRIC PROTECTION USING FORWARD ERROR CORRECTION

(75) Inventors: Thomas C. McDermott, III, Plano, TX (US); Harry C. Blackmon, Plano, TX (US); Tony M. Brewer, Plano, TX (US); Harold W. Dozier, Dallas, TX (US); Jim Kleiner, Dallas, TX (US); Gregory S. Palmer, Plano, TX (US); Keith W. Shaw, Plano, TX (US); David Traylor, Richardson, TX (US); Dean E. Walker, Plano, TX (US)

(73) Assignee: Foundry Networks, LLC, San Jose, CA (US)

( * ) Notice: Subject to any disclaimer, the term of this patent is extended or adjusted under 35 U.S.C. 154(b) by 1229 days.

This patent is subject to a terminal disclaimer.

(21) Appl. No.: 10/981,841

(22) Filed: Nov. 5, 2004

(65) Prior Publication Data
US 2005/0083921 A1   Apr. 21, 2005

Related U.S. Application Data

(63) Continuation of application No. 09/703,064, filed on Oct. 31, 2000, now Pat. No. 6,894,970.

(51) Int. Cl.
*H04L 12/26* (2006.01)
(52) U.S. Cl. ........................... 370/244; 370/401; 370/474
(58) Field of Classification Search ........................ None
See application file for complete search history.

(56) References Cited

U.S. PATENT DOCUMENTS
4,195,351 A * 3/1980 Barner et al. ................. 370/223

(Continued)

FOREIGN PATENT DOCUMENTS
EP   1 037 492   9/2000
(Continued)

OTHER PUBLICATIONS

Aweya, J., "On the design of IP routers Part 1: Router architectures" Journal of Systems Architecture, Jul. 19, 1999, pp. 483-511.

(Continued)

*Primary Examiner* — Gregory Sefcheck
*Assistant Examiner* — Joshua Smith
(74) *Attorney, Agent, or Firm* — Shun Yao; Park, Vaughan, Fleming & Dowler LLP

(57) ABSTRACT

Instead of alternatively utilizing only one fabric or the other fabric of a redundant pair, both fabrics simultaneously transmit duplicate information, such that each packet forwarding module (PFM) receives the output of both fabrics simultaneously. In real time, an internal optics module (IOM) analyzes each information chunk coming out of a working zero switch fabric; simultaneously examines a parallel output of a working one duplicate switch fabric; and compares on a chunk-by-chunk basis the validity of each and every chunk from both switch fabrics. The IOM does this by examining forward error correction (FEC) check symbols encapsulated into each chunk. FEC check symbols allow correcting a predetermined number of bit errors within a chunk. If the chunk cannot be corrected, then the IOM provides indication to all PFMs downstream that the chunk is defective. Under such conditions, the PFMs select a chunk from the non-defective switch fabric. Under error-free normal conditions, however, the PFMs select a chunk arbitrarily from a default switch fabric. In this way, each chunk in real time is selected from a non-defective source and is thus guaranteed to be error free. Accordingly, if a switch fabric fails, no information chunks are lost anywhere in the system.

17 Claims, 8 Drawing Sheets

U.S. PATENT DOCUMENTS

| | | | |
|---|---|---|---|
| 4,542,507 A * | 9/1985 | Read | 370/248 |
| 5,107,489 A * | 4/1992 | Brown et al. | 370/389 |
| 5,222,063 A | 6/1993 | Foglar et al. | |
| 5,265,088 A * | 11/1993 | Takigawa et al. | 370/399 |
| 5,271,004 A * | 12/1993 | Proctor et al. | 370/392 |
| 5,278,969 A | 1/1994 | Pashan et al. | |
| 5,331,631 A * | 7/1994 | Teraslinna | 370/392 |
| 5,361,249 A * | 11/1994 | Monastra et al. | 370/217 |
| 5,369,635 A * | 11/1994 | Gandini et al. | 370/389 |
| 5,392,328 A * | 2/1995 | Schmidt et al. | 370/244 |
| 5,485,453 A * | 1/1996 | Wahlman et al. | 370/389 |
| 5,499,290 A * | 3/1996 | Koster | 370/385 |
| 5,530,806 A * | 6/1996 | Condon et al. | 370/397 |
| 5,537,428 A * | 7/1996 | Larsson et al. | 370/395.1 |
| 5,561,662 A * | 10/1996 | Kakuma et al. | 370/252 |
| 5,602,844 A * | 2/1997 | Lyles | 370/411 |
| 5,724,352 A | 3/1998 | Cloonan et al. | |
| 5,754,118 A * | 5/1998 | Brunner | 370/217 |
| 5,809,022 A * | 9/1998 | Byers et al. | 370/395.51 |
| 5,844,887 A | 12/1998 | Oren et al. | |
| 5,862,138 A * | 1/1999 | Liu | 370/406 |
| 5,883,890 A * | 3/1999 | Okanoue et al. | 370/401 |
| 5,909,427 A * | 6/1999 | Manning et al. | 370/219 |
| 5,987,018 A * | 11/1999 | Freeburg et al. | 370/310.2 |
| 6,061,798 A * | 5/2000 | Coley et al. | 726/12 |
| 6,087,958 A * | 7/2000 | Arzt | 370/216 |
| 6,151,318 A | 11/2000 | Woodward et al. | |
| 6,212,175 B1 * | 4/2001 | Harsch | 370/338 |
| 6,226,261 B1 | 5/2001 | Hurtta et al. | |
| 6,259,699 B1 | 7/2001 | Opalka et al. | |
| 6,327,267 B1 * | 12/2001 | Valentine et al. | 370/466 |
| 6,411,599 B1 | 6/2002 | Blanc et al. | |
| 6,434,191 B1 * | 8/2002 | Agrawal et al. | 370/252 |
| 6,449,275 B1 * | 9/2002 | Andersson et al. | 370/389 |
| 6,473,827 B2 | 10/2002 | McMillen et al. | |
| 6,507,646 B1 * | 1/2003 | Fishler | 370/259 |
| 6,535,310 B1 | 3/2003 | Rasala et al. | |
| 6,574,232 B1 | 6/2003 | Honig et al. | |
| 6,587,438 B1 * | 7/2003 | Brendel | 370/254 |
| 6,587,457 B1 * | 7/2003 | Mikkonen | 370/356 |
| 6,597,826 B1 * | 7/2003 | Ramaswami et al. | 385/17 |
| 6,606,326 B1 * | 8/2003 | Herring | 370/412 |
| 6,665,268 B1 * | 12/2003 | Sato et al. | 370/242 |
| 6,667,955 B1 | 12/2003 | Blanc et al. | |
| 6,711,243 B1 * | 3/2004 | Holt | 370/390 |
| 6,711,632 B1 * | 3/2004 | Chow et al. | 709/237 |
| 6,826,197 B1 * | 11/2004 | Goode et al. | 370/466 |
| 6,831,927 B1 | 12/2004 | Castro | 370/473 |
| 6,836,482 B1 * | 12/2004 | Zellerhoff | 370/278 |
| 6,850,704 B1 * | 2/2005 | Dave | 370/217 |
| 6,891,823 B1 * | 5/2005 | Schwartz et al. | 370/351 |
| 6,910,148 B1 | 6/2005 | Ho | |
| 6,938,179 B2 | 8/2005 | Iyer | |
| 7,035,267 B1 * | 4/2006 | Zhou et al. | 370/472 |
| 7,093,160 B2 | 8/2006 | Lau | |
| 7,236,453 B2 | 6/2007 | Visser | |
| 7,269,133 B2 | 9/2007 | Lu | |
| 7,292,535 B2 | 11/2007 | Folkes | |
| 2003/0128709 A1 * | 7/2003 | Venkitakrishnan | 370/400 |
| 2006/0072454 A1 * | 4/2006 | Ain et al. | 370/230 |

FOREIGN PATENT DOCUMENTS

WO    WO 94/27391    11/1994

OTHER PUBLICATIONS

Dr. Bostica, B., et al. "The Role of Electric and Photonics In the Architectural Evolution of Switching Systems," XVI World Telecom Congress Proceedings, Sep. 21, 1997, pp. 565-571.

European Search Report, dated Feb. 25, 2004, 5 pages.

U.S. Appl. No. 09/703,057, filed Oct. 31, 2000, Tony M. Brewer et al.

U.S. Appl. No. 09/703,056, filed Oct. 31, 2000, Tony M. Brewer et al.

U.S. Appl. No. 09/703,038, filed Oct. 31, 2000, Tony M. Brewer et al.

U.S. Appl. No. 09/702,958, filed Oct. 31, 2000, Tony Brewer et al.

U.S. Appl. No. 09/703,027, filed Oct. 31, 2000, Harry C. Blackmon et al.

U.S. Appl. No. 09/703,043, filed Oct. 31, 2000, Harry C. Blackmon et al.

\* cited by examiner

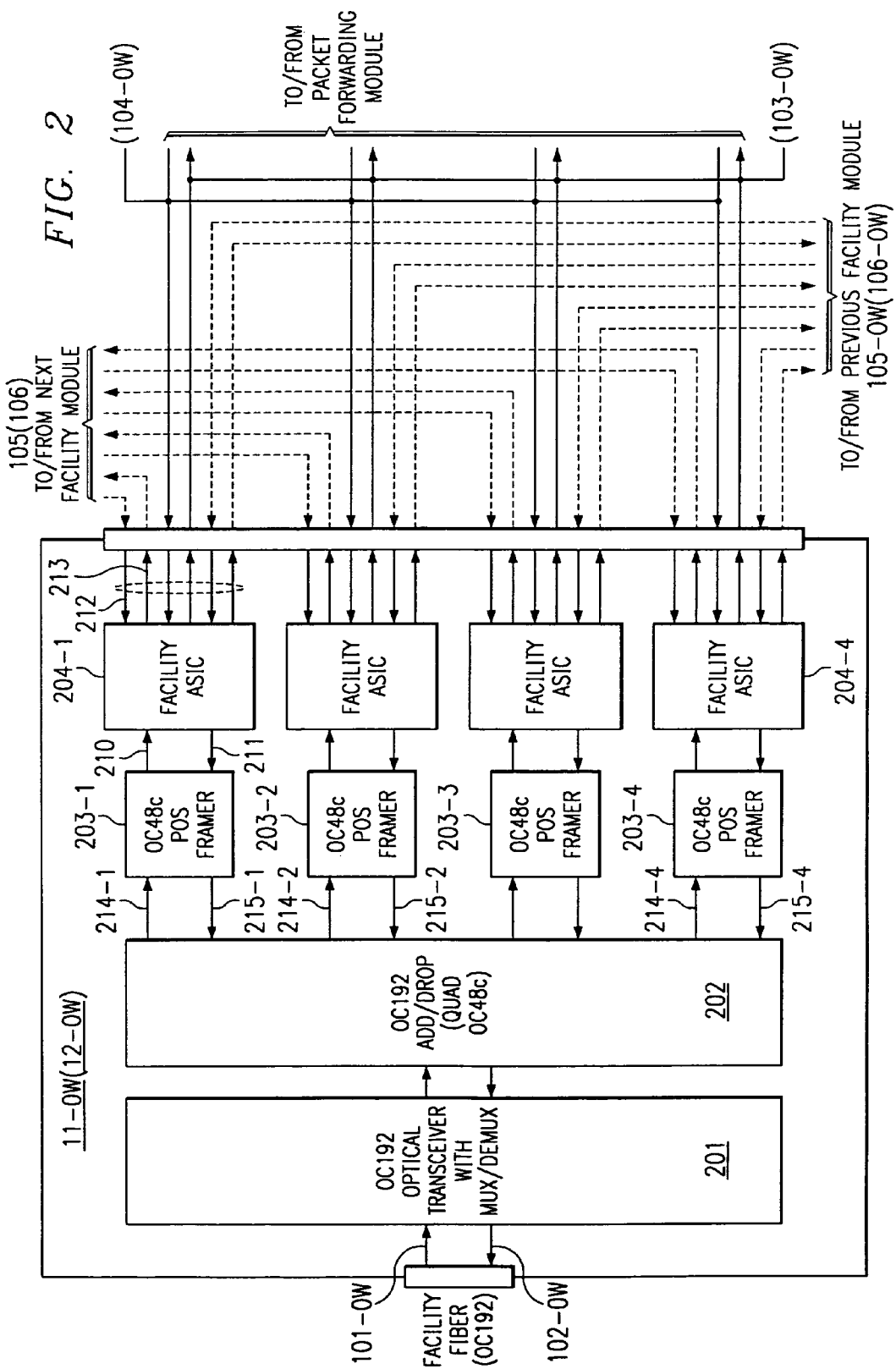

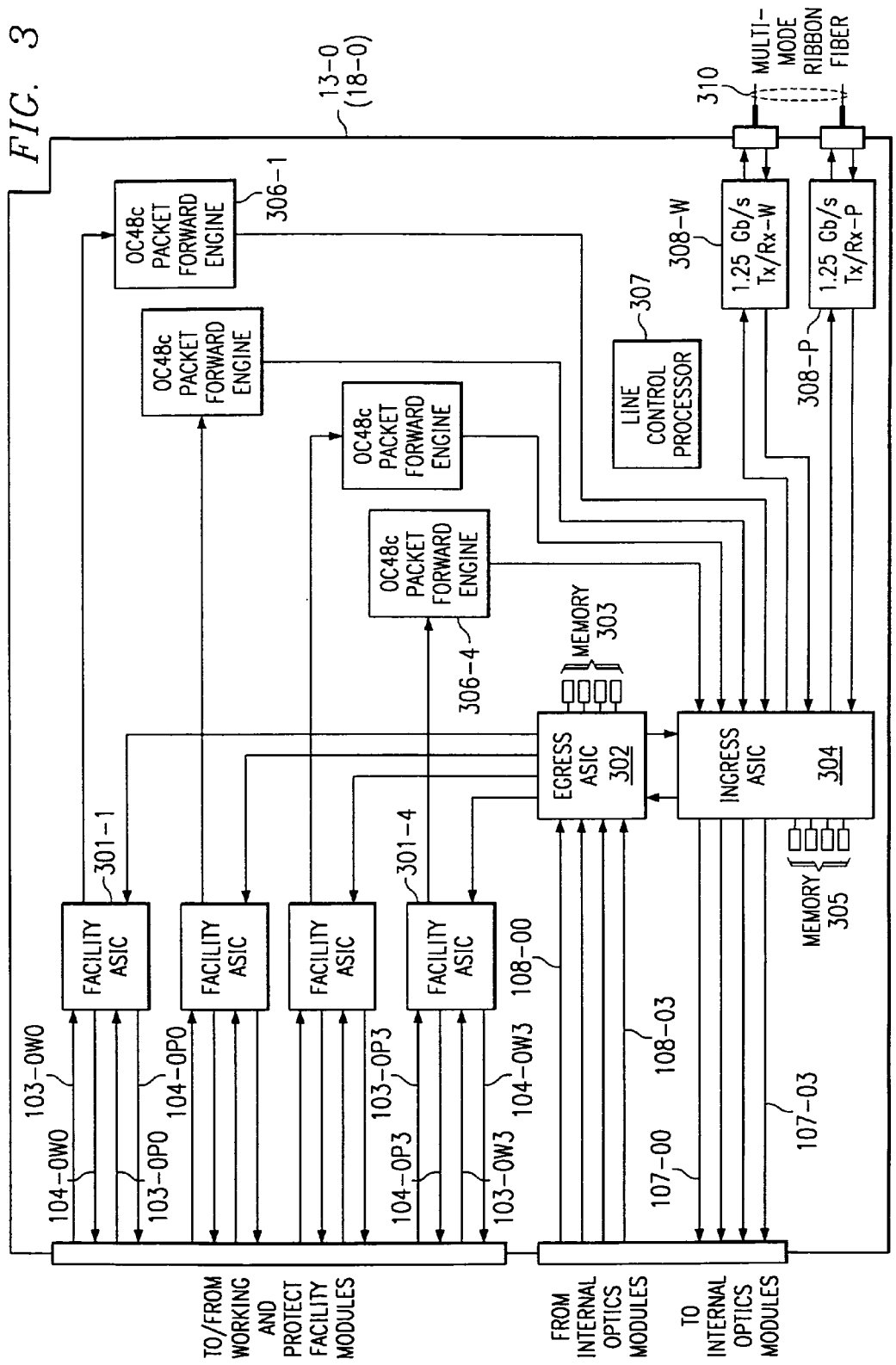

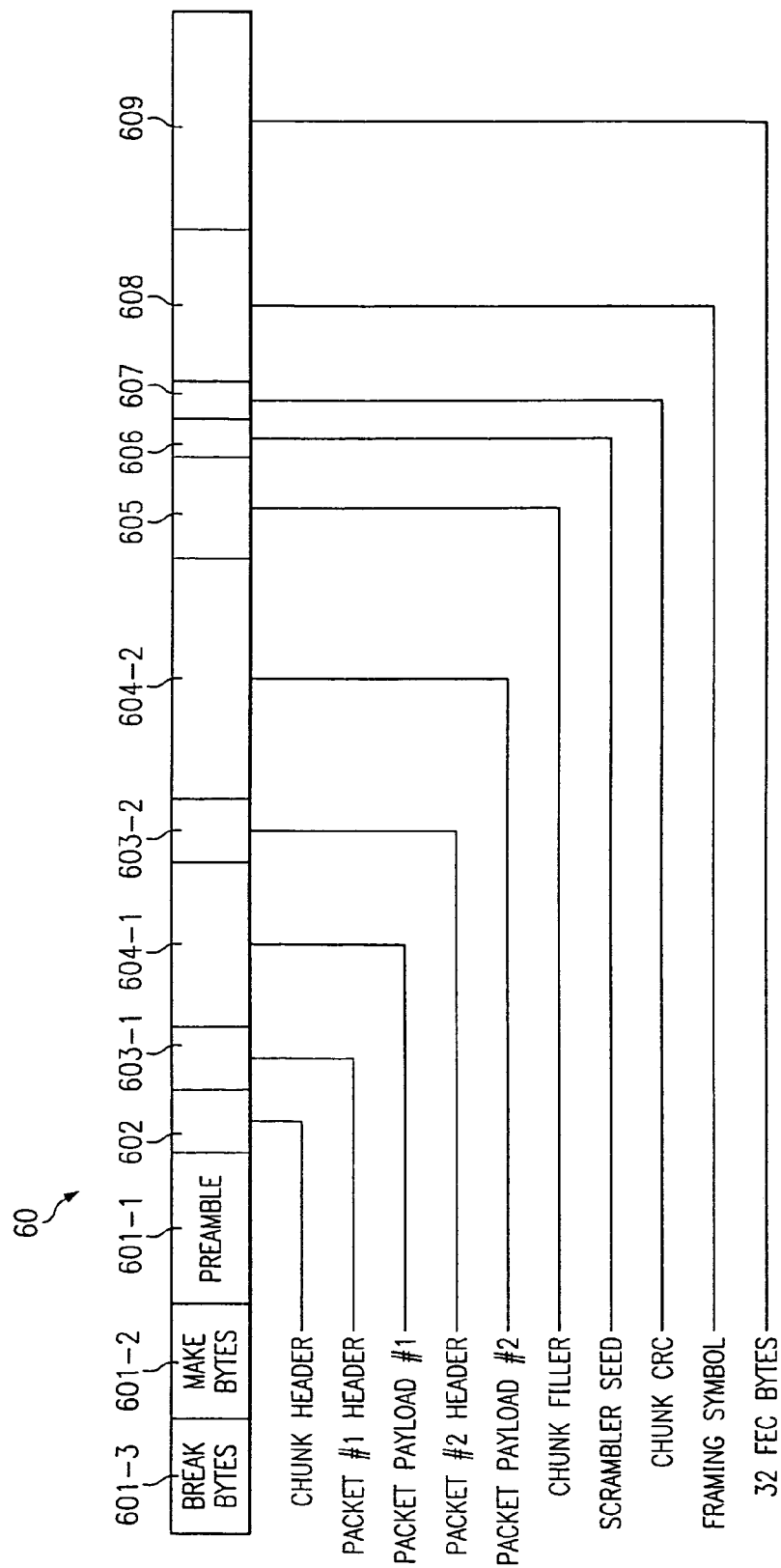

ROUTER SWITCH FABRIC PROTECTION USING FORWARD ERROR CORRECTION

RELATED APPLICATIONS

This application is a continuation of co-pending and commonly assigned U.S. application Ser. No. 09/703,064, filed Oct. 31, 2000, entitled "Router Switch Fabric Protection Using Forward Error Correction," the disclosure of which is hereby incorporated herein by reference.

This application is related to co-pending and commonly assigned U.S. application Ser. No. 09/703,057, filed Oct. 31, 2000, entitled "System And Method For IP Router With an Optical Core," to co-pending and commonly assigned U.S. application Ser. No. 09/703,056, filed Oct. 31, 2000, entitled "System and Method for Router Central Arbitration," to co-pending and commonly assigned U.S. application Ser. No. 09/703,038, filed Oct. 31, 2000, entitled "System and Method for Router Data Aggregation and Delivery," to co-pending and commonly assigned U.S. application Ser. No. 09/703,027, filed Oct. 31, 2000, entitled "Router Network Protection Using Multiple Facility Interfaces," and to co-pending and commonly assigned U.S. application Ser. No. 09/703,043, filed Oct. 31, 2000, entitled "Router Line Card Protection Using One-for-N Redundancy," the disclosures of which are incorporated herein by reference. This application is also related to commonly assigned U.S. application Ser. No. 09/702,958, filed Oct. 31, 2000, entitled "Timing and Synchronization for an IP Router Using an Optical Switch," issued Mar. 23, 2004 as United States Patent 6,711,357.

TECHNICAL FIELD

This application relates to the field of optical communication networks, and particularly to large-scale routers for optical communication networks.

BACKGROUND

Routers form a central part of a data communication network and perform general routing of data packets. Headers in each packet control the route taken by that packet through the network. There can be multiple routers in a network. Information, as contained in the data packets, typically travels from one router to the next router, and eventually reaches the destination edge of the network, where a destination edge router receives the information packet and decides where it goes from there. Typically it goes to an Internet service provider at the opposite edge of the edge router. If the destination is a household PC, the Internet service provider then sends the information to the destination computer. If there is corporate access to the network, the information may go from the edge router directly to a corporate site.

A fabric is a collection of devices which cooperatively provide a general routing capability. Internet protocol (IP) routers require protection from fabric failures, for example optical fabric, packet fabric, and switch element fabric failures. The prior art uses duplicated switch fabrics and line cards that feed both switch fabrics simultaneously but receive from only one switch fabric at any given time.

Prior art designs based upon duplex or duplicated fabrics, while fully protecting from individual fabric failures, permit extensive loss of packets during a failure, detection, and protection event. In the prior art a line card receives output from one switch fabric, unless it detects a failure on that switch fabric, in which case it then spends about 50 milliseconds switching over to the redundant switch fabric. In an outage of a fabric, if it requires fifty milliseconds for the receiving line card to determine that a fabric is defective and to decide to start receiving instead from the redundant fabric, then all packets passing through that defective fabric during that fifty milliseconds are lost. The number of packets lost per line card is equal to the switchover time to the alternate fabric multiplied by the packet transmission rate through that particular switch fabric. Multiplying by the total number of line cards in the system, the result can be a huge amount of data lost during each 50 millisecond transient event, which creates a large impact on the network as a whole.

Needed in the art are a new system and method of IP router switch fabric protection that prevent or minimize loss of data packets during a fabric failure, detection, and protection event.

SUMMARY OF THE INVENTION

The present invention is directed to a system and method which, instead of selectively utilizing one fabric or the other fabric of a redundant pair, utilize both fabrics simultaneously and transmit duplicate identical information through both fabrics, such that each packet forwarding module (PFM) receives the output of both fabrics simultaneously.

All information moves through an optical switch fabric in chunks. A chunk is defined as a uniformly sized unit of information that is passed through an optical switch during one cycle of the switch. In real time, an internal optics module (IOM) analyzes each chunk coming out of a working zero switch fabric; simultaneously examines the output of a working one copy of this switch fabric; and compares on a chunk-by-chunk basis the validity of each and every chunk from both switch fabrics. The IOM does this by examining forward error correction (FEC) check symbols encapsulated into each chunk. The FEC check symbols allow correcting a predetermined number of bit errors within a chunk. If the chunk cannot be corrected, then the IOM provides indication to all PFMs downstream from the IOM that the chunk is defective. Under such conditions, the PFMs select a chunk from the non-defective switch fabric. Under error-free normal conditions, however, the PFMs select a chunk arbitrarily from a default switch fabric.

Thus, a PFM receives chunks from both working zero and working one copies of a switch fabric. If both chunks are error-free, it arbitrarily discards one chunk and keeps the duplicate chunk, since either chunk is good. If the PFM receives two simultaneous duplicate chunks, and one of those chunks is defective, the PFM recognizes and discards the defective chunk and keeps the good chunk. If both simultaneous chunks are defective, then a double fault has occurred, which is an unlikely occurrence and is outside the principal objects of the present invention.

In this way, each chunk in real time is selected from a non-defective source and is thus guaranteed to be error free. Accordingly, if a switch fabric fails, no chunks are lost anywhere in the system.

Embodiments according to the present invention are designed to protect against all single fault occurrences. Single faults include a single fault of a module, a single fault of a cable, or a single fault of a path. Accordingly, although some double faults are protected against, double faults generally lie beyond the scope of primary objects of the present invention and thus are not in general protected against.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 2 is a block diagram illustrating data flow through facility modules of a router in more detail;

FIG. 3 is a block diagram illustrating information flow through a typical packet forwarding module;

FIG. 6 is a block diagram illustrating the format of a data chunk in a communication network router.

DETAILED DESCRIPTION

Figure 1A:
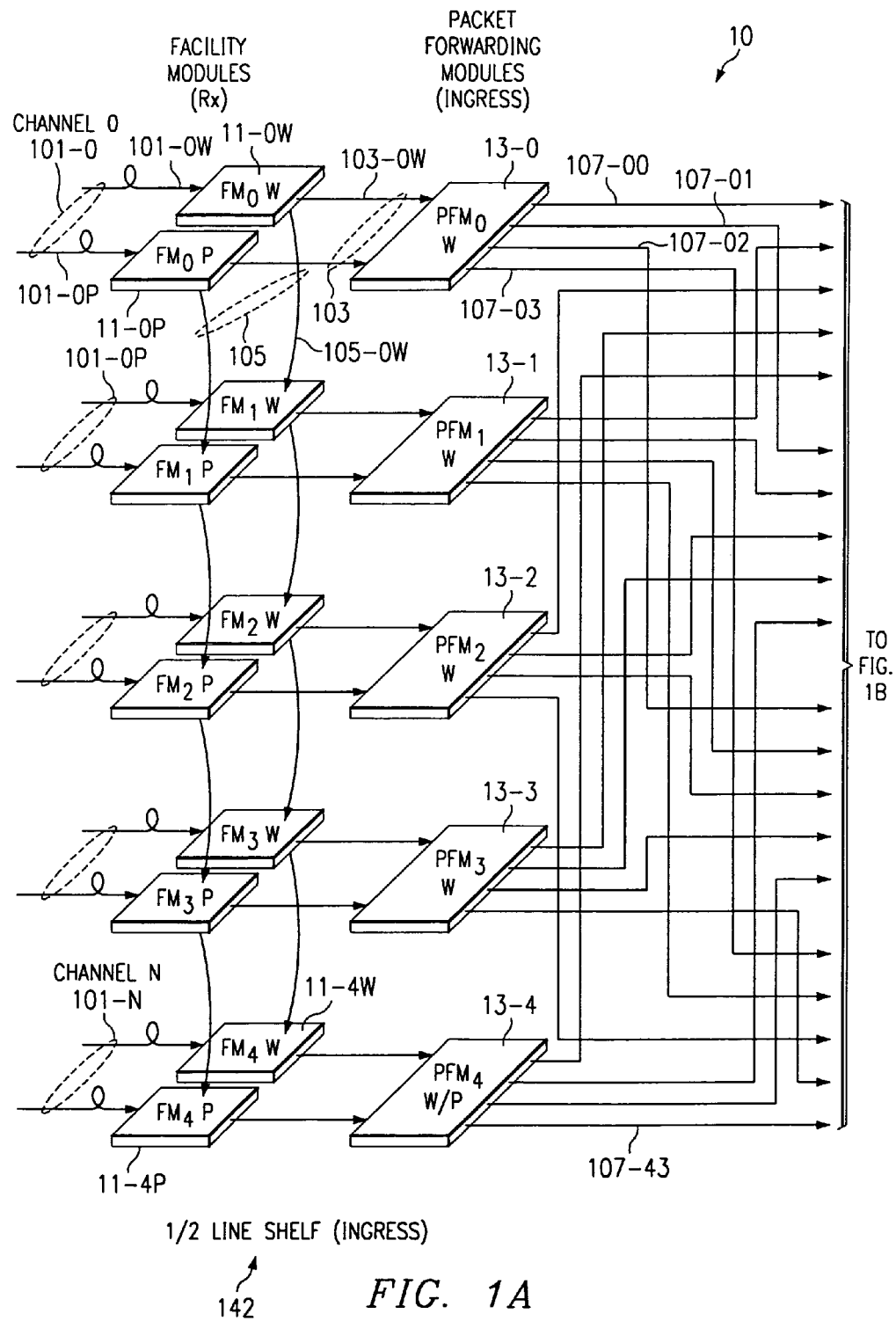
FIGS. 1A-1C form a schematic diagram showing an overview of the data paths through a router, in an embodiment of the present invention.
Figure 1B:
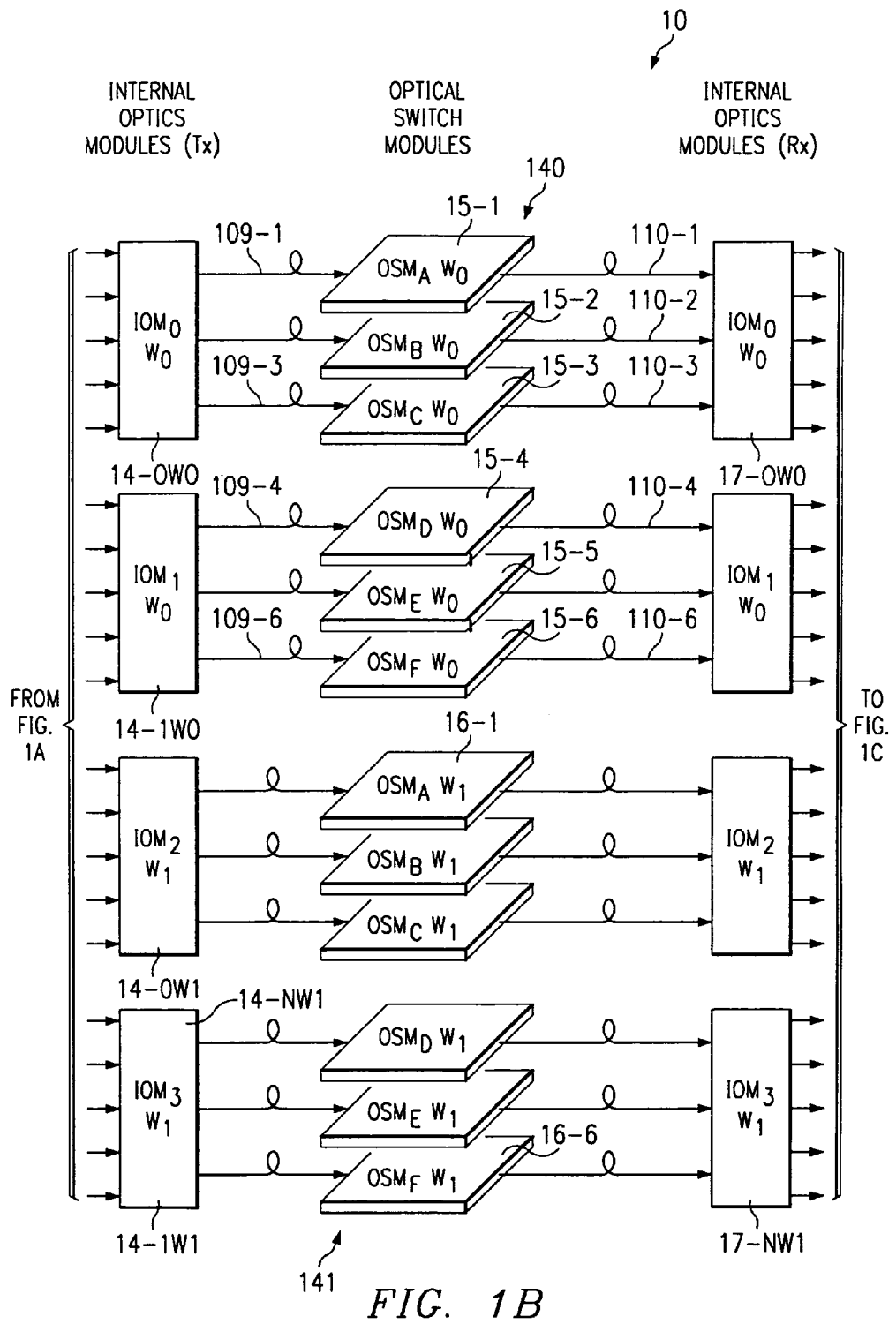
Figure 1C:
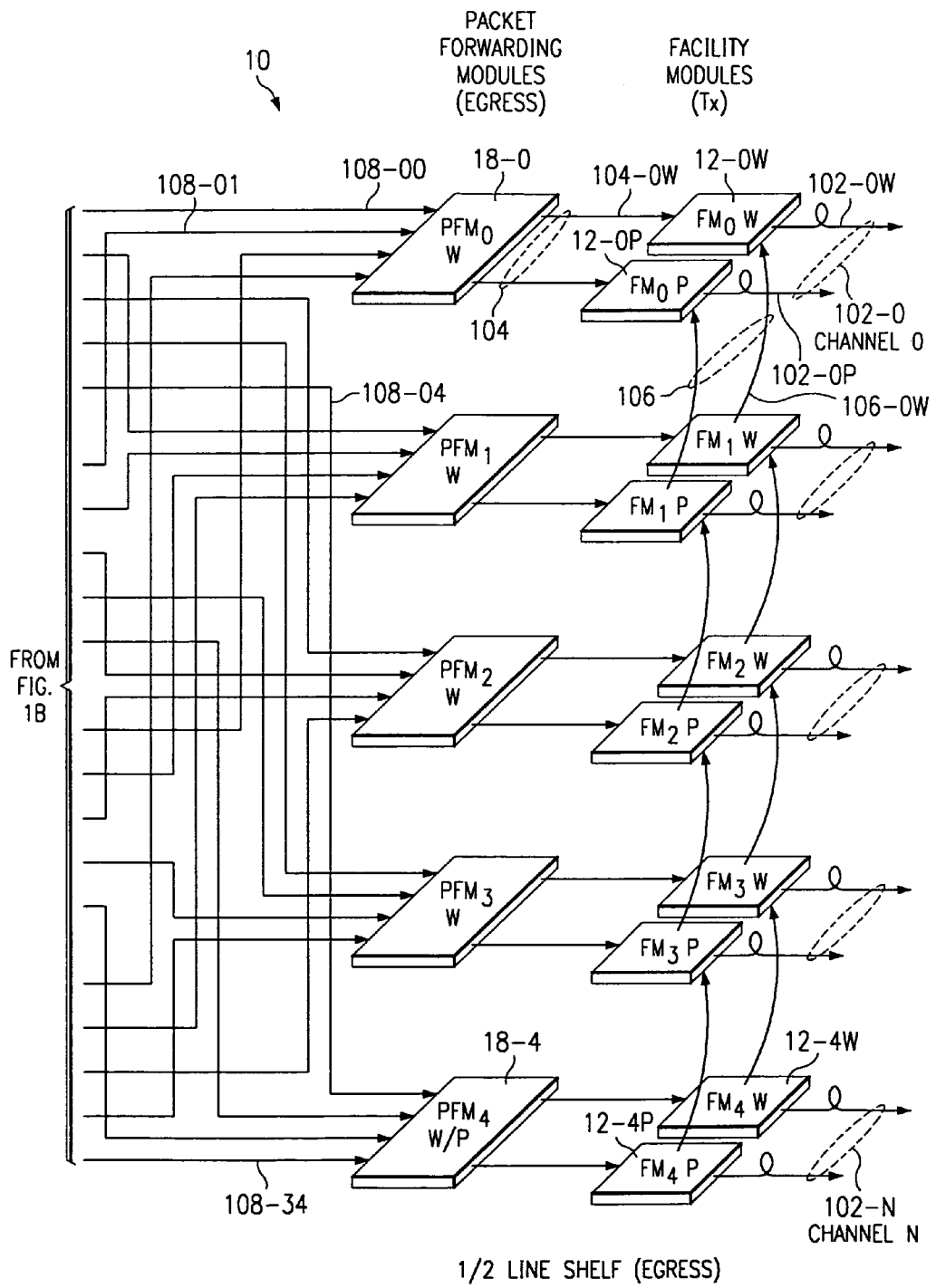

FIGS. 1A-1C form a schematic diagram showing an overview of the data paths through a router 10, in an embodiment of the present invention. For ease of understanding, FIGS. 1A-1C are partitioned into three sequentially adjacent panels. FIG. 1A-1C do not show how router system 10 is wired, but simply illustrates the flow of data. At the upper left portion of FIG. 1A, an input 101-0 is a first SONET data channel, formatted as Packet-over-SONET in the present embodiment. Input 101-0 includes two optical fibers, namely a working input fiber 101-0W and a protect input fiber 101-0P. Fibers 101-0W, 101-0P carry duplicated information into router 10 from a peer source equipment e.g., another router or piece of SONET transmission equipment, compatible with the Packet-over-SONET format. Protect and working facility module cards 11-0P and 11-0W independently receive duplicate input from respective optic fibers 101-0P and 101-0W and perform an integrity check on the information by computing SONET parity and SONET framing words to determine if the information is valid, and independently check SONET protection switching 'K' Bytes. Both facility modules 11-0W and 11-0P perform essentially identical functions on the information. Each facility module independently evaluates the SONET frame and determines whether the information contained on it is valid. Facility modules 11-0W and 11-0P then extract packets from their respective SONET frames and transfer those packets over a packet bus 103 to a packet forwarding module (PFM) 13-0.

Working facility module 11-0W and protect facility module 11-0P respectively provide duplicate input interfaces 103-0W and 103-0P to packet forwarding module 13-0. A system controller (not shown in FIGS. 1A-1C) examines the status of facility modules 11-0W and 11-0P and selects as the in-service facility module the one that is receiving properly framed and bit-error-free packets on its input, in accordance with the SONET standard or as selected by SONET 'K' Bytes. Should the information coming into a facility module, for example facility module 11-0P, have bit errors or other defects, then facility module 11-0P raises an alarm at the system controller (not shown in FIGS. 1A-1C). The system controller then selects facility module 11-0W as the source of input from that channel, and facility module 11-0W strips the packets out of the SONET framing overhead and transfers those raw packets over industry standard bus 103-0W to packet forwarding module 13-0. Typically facility modules 11-0W and 11-0P, along with packet forwarding module 13-0, are contained in a line shelf, denoted in FIG. 1A as ½ line shelf 142 (ingress) and described below in more detail.

There are actually N+1 multiple packet forwarding modules 13-0 through 13-N. In FIG. 1A, N equals 4, providing for four working packet forwarding modules 13-0 through 13-3 and a fifth designated protect packet forwarding module 13-4. In this case protect packet forwarding module 13-4 is a spare module available to replace any working module 13-0 through 13-3. Should any one of working packet forwarding modules 13-0 through 13-3 fail, then fifth packet forwarding module 13-4 can substitute for the failed packet forwarding module 13-0 through 13-3. This protection configuration is known as "one-for-four" protection. Similarly, on the output side of router 10 shown in the right side portion of FIG. 1C, packet forwarding modules 18-0 through 18-3 are all working modules, and packet forwarding module 18-4 is a spare protect packet forwarding module available as a replacement in the event of failure of any working packet forwarding module 18-0 through 18-3. Typically packet forwarding modules 18-0 through 18-4 are contained in a line shelf, denoted in FIG. 1C as ½ line shelf 143 (egress) and described below in more detail.

Protection works through a daisy-chain data bus 105 cascading from Channel 0 to Channel 1, to Channel 2, to Channel 3, and to Channel 4, linking facility modules 11-0W through 11-4W. A duplicate data bus interconnects from Channel 4 up to Channel 0, linking facility modules 11-4P through 11-0P. If for example packet forwarding module 13-1 were to fail, then input facility modules 11-1P and 11-1W send their traffic down data bus 105 linking facility modules 11-2 and 11-3 to facility module 11-4, which then switches those inputs to protect packet forwarding module 13-4. Thus if one channel fails, traffic, instead of going through the failed channel, goes down data bus chain 105 to designated protect module 13-4. If a particular facility module needs to be removed for maintenance purposes on one data bus, the duplicate data bus is maintained intact, allowing for hot replacement of any of the facility modules, working and protect, even if a packet forwarding module protection switch is in effect at the time. Similarly on the output side of router 10, output data is rerouted up a data bus chain 106 to Channel 1 and then out of router 10.

In operation, if PFM 13-1 fails, a microprocessor in the line shelf containing the failed packet forwarding module detects the failure, notices if the system is configured for one-for-four protection, and instructs switches on facility modules 11-1 through 11-4 to switch traffic that used to be in Channel 1 down to Channel 4. Channel 4 contains facility modules 11-4P and 11-4W on the input side and facility modules 12-4P and 12-4W on the output side respectively of router 10. These modules are connected to optical inputs and outputs only when utilizing protect PFM 13-4 or 18-4 as a working module and not as protection for PFMs 13-0 through 13-3 or 18-0 through 18-3. If PFM 13-4 or 18-4 is a working module, then daisy chain bus 105, 106 is not utilized in any way, and there are simply 5 working inputs and 5 working outputs. Accordingly, two modes of operation are available; namely one-for-N protection, for example one-for-four; or zero-for-five protection, meaning no protect modules and five working modules. Without requiring any wiring changes, router system 10 will function in either mode.

An alternative operating mode designates input 101-N and output 102-N for lower priority traffic. That traffic would be deliberately interrupted in the event of a failure of any of the packet forwarding modules carrying higher priority traffic and requiring a protect packet forwarding module to service that failure.

Information is transferred from PFM 13-0 to internal optics modules (IOMs) 14 as chunk payloads of data, such that a chunk contains typically 400 bytes of payload data. Packets contained in virtual out queues of PFM 13-0 that are destined for the same egress PFM can be combined to form a single chunk payload of data. Thus, multiple small packets or just a segment of a larger packet can be loaded into a single chunk. A maximum of two chunks can be transferred from a PFM 13-0 to the IOMs 14-0W0 and 14-1W0 during each chunk period. The same chunks are replicated and transferred in parallel to IOMs 14-0W1 and 14-1W1.

Referring to FIG. 6, each individual packet within chunk 60 has its own header, for example, fields 603-1 and 603-2, which includes information specific to that packet. Packet header information specifies whether a packet segment contained in the chunk is a packet start or a packet end, if that packet segment is the entire packet including both start and end, or whether the packet segment is the middle of the packet. This information is used for reassembling multi-chunk packets as well as for specifying whether a packet is contained completely within the chunk. Additionally, contained in a packet header is a byte count specifying the number of bytes contained in the packet segment associated with this particular packet header. Also included is a bit, which if active, indicates that the packet should never be discarded. This bit is frequently set for a guaranteed bandwidth packet in chunks marked as guaranteed bandwidth chunks. Best effort 1, 2 and 3 classes should be designated only if the chunk has been indicated as a best effort chunk. There is a Point-to-Point Protocol (PPP) header format specifying how the destination facility module should treat the packet in terms of what PPP format should be appended to the chunk as it is being sent out. Packet header 603-1, 603-2 also contains a bit indicating whether the packet should be sent out through the output of the router or whether it should be looped back into the destination packet forwarding engine to be used by that packet forwarding engine. Packet header 603-1, 603-2 also includes a destination tributary indicator specifying to which tributary at a destination port the packet should be sent.

Fields 604-1 and 604-2 within the chunk format are the actual payloads of the packets associated with respective packet headers 603-1 and 603-2. Packet header/payload pairs, for example 603-1 and 604-1, can be contained within the chunk payload up to a limit on the order of nine of these pairs, due to the 400 byte total payload size of a chunk versus a minimum packet size of 40 bytes. A chunk filler 605 is the next field. If there are not sufficient data in packets to fill the chunk payload, then the unused payload capacity is filled with non-traffic bytes.

IOM modules 14 encapsulate FEC code words as multiple redundant check symbols into each of the chunks. The present implementation uses a conventional interleaved Reed-Solomon FEC coding. IO modules 14-0W0, 14-1W0 provide duplicate working module capacity for a working zero optical switch plane. Similarly IO modules 14-0W1, 14-1W1 provide duplicate working module capacity for a working one optical switch plane. Switch plane pairs in this case are not configured as working and protect, but as working zero and working one copies respectively, such that copy zero switch plane containing optical switch modules 15-1 through 15-6 and duplicate copy one switch plane containing optical switch modules 16-1 through 16-6 each provide 6 optical switches worth of capacity.

IO module 14-0W0 transfers information from PFM 13-0 to one of three optical switch modules 15-1, 15-2 and 15-3. IO module 14-0W0 sends the information to the appropriate optical switch module based on the decisions of the central arbiter module (not shown in the figures), described in U.S. application Ser. No.09/703057, cited above. Illustratively, one input comes into an optical switch module and one output goes out from that same optical switch module. In an actual system, these inputs and outputs in fact provide connectivity across router system 10. FIG. 1B shows optical switch module 15-1 connected to an egress side internal optics module 17-0W0 through an output fiber 110-1. For clarity, six such optical switch modules 15-1 through 15-6 are shown in the top portion of FIG. 1B. In fact, in one implementation each of these optical switch modules has 64 optical fibers in and 64 optical fibers out, with these 64 optical fiber pairs fanning out to a great many different line shelves. Different shelves have multiple fiber inputs and outputs. Six parallel optical switch modules 15-1 through 15-6 provide 6 times the data capacity of a single switch module. Other embodiments can have for example, 36 of these modules rather than six.

Chunks of information are sent individually through optical switch modules 15-1 through 15-N and 16-1 through 16-N and received by IO modules 17 on line shelves at the egress side of router 10. IO module 17 checks the FEC check symbols to validate the accuracy of the data bits within the chunk. It then removes the FEC check symbols and transfers the resulting chunk payloads to packet forwarding module 18-0, 18-1, 18-2, 18-3, or 18-4 as appropriate for each destination address. Similarly, the working one optical switch plane containing optical switch modules 16-1 through 16-N does substantially the same thing in parallel. Thus, working zero and working one optical switch planes perform this process duplicatively and in parallel. This allows the packet forwarding modules on the egress side, such as PFM 18-0, to select those chunk payloads that are error free either from working zero or from working one optical switch plane on a chunk by chunk basis. If there is an error in an optical switch, then egress PFM modules 18-0 through 18-N can identify which working plane, zero or one, is accurate. Consequently errors in a switch are contained and do not ripple out through the network.

If there are only a few bit errors going through a switch, those errors can be corrected in real time by FEC decoding in IO modules 17. If a path through a working zero optical switch fails completely, then a path through the working one optical plane can be utilized instead. Further, because each IO module 17 computes the corrupted bits and how many bits were corrected on every path of the system, IO modules 17 provide a detailed fault analysis not only of the failed fiber or optical switch plane, but even down to the level of an individual switch defect, which then can also be isolated. Importantly, the data flowing across for example OS Module 15-1 and the data flowing across OS Module 16-1 in the absence of failures in the system are identical, byte for byte. This provides a hot standby, chunk for chunk.

After selecting error-free chunk payloads, packet forwarding modules 18-0 through 18-N then reassemble the chunks into individual IP packets and forward those packets across interface links 104, as previously described.

In FIGS. 1A-1C for the purpose of clarity, corresponding input and output functions are shown on separate circuit cards in separate ½ line shelves 142 and 143 respectively. In some embodiments corresponding input and output functions are combined on a single circuit card in a single line shelf combining ½ line shelves 142 and 143, thereby creating a folded configuration. For example, working input facility module 11-0W and working output facility module 12-0W can be combined on a single physical printed circuit card with two optical connectors, one in and one out. Similarly protect input facility module 11-0P and protect output facility module 12-0P can be combined on a single physical circuit card with two optical connectors, one in and one out. Likewise, input and output packet forwarding modules 13-0 and 18-0 also can be combined on a single physical circuit card in a single line shelf. In a folded configuration, if packet forwarding modules 13-0 and 18-0 share the same physical card, then there is a single card for Channel 0, likewise a single card each for Channels 1, 2, 3, and a fifth card for a Protect channel 4. Because there is a single physical card for input and output functions, then if a card fails, the protection ratio is equal for both input and output modules on that card. In some embodiments internal optics modules 14-0W0 and 17-0W0 similarly share the same physical circuit card, which in the present implementation is contained in the same line shelf 142, 143 with combined input/output facility modules 11, 12 and combined input/output packet forwarding modules 13, 18.

FIG. 2 is a block diagram illustrating data flow through facility modules 11-0W and 12-0W, for example, in more detail. Facility optical fibers are connected on the left through input and output interfaces 101-0W and 102-0W respectively. In a preferred embodiment shown in FIG. 2, for purposes of illustration input and output facility modules 11-0W and 12-0W occupy the same circuit board in the same line shelf in a folded configuration. In other embodiments, the input and output facility modules 11-0W and 12-0W are located on separate physical circuit cards.

A signal, e.g., a packet-over-SONET (POS) formatted IP packet, arrives at input 101-0W to a signal processing module 201 typically in a ten-Gbit/sec OC192 SONET datastream. Processing module 201 contains an optical receiver, an optical multiplexer and associated demultiplexer, and a transmitter associated with those. For example, the received signal is demodulated from optical input 101-0W into an electronic signal, and then demultiplexed from a single ten-Gbit-per-second datastream in this example down to a parallel bus at a lower data speed. That parallel bus of signals then leaves module 201 and goes into a processing module 202. Module 202 contains an OC192 demultiplexer, which extracts a single 2.5 Gbit/second OC48 substream out of the OC192 stream and delivers a packet-over-SONET (POS) input to a framer 203-1, which is an industry standard off the shelf component. Likewise, module 202 extracts the other three OC48 substreams and sends these to POS framers 203-2, 203-3, and 203-4 respectively. At this point there are four parallel 2.5 Gbit/sec SONET streams, one to each of four POS framers 203-1 through 203-4, which extract from each OC48 stream the individual IP packets. POS framers 203-1 through 203-4 first have to find the IP packets in the datastream and then have to extract the packets from the SONET continuous datastream. This is done on the four parallel OC48 streams. Once it has removed the packets from the SONET frame, each POS framer 203-1 through 203-4 delivers those packets to a facility ASIC 204-1 through 204-4 respectively.

The principal function of facility ASICs 204-1 through 204-4 is to send that information to an appropriate packet forwarding module (not shown in FIG. 2), in this case through an interface 103-0W consisting of four parallel interfaces for the four packet streams, or, if directed, to receive packets from an upstream neighboring facility ASIC on an interface 103-4W and switch 103-4W to 103-0W in a protect mode. Otherwise, in a working mode of operation, a facility ASIC sends the information out through interface 103-0W, and information input on 103-4W is directed through cascading protection bus interface 105-0W. The normal sequence is for a facility ASIC to take information from above and switch it below, letting the received traffic pass straight through onto interface 103-0W. All four of facility ASIC switches 204-1 through 204-4 are ganged, such that they operate in parallel. With faster buses, faster framers, or faster facility ASICs, a single ASIC or bus, for example, could perform the above described functions instead of four required at the present state of technology.

Referring again to FIG. 2, on the egress side facility ASIC 204-1 directs the information packets through output link 211 to Packet-over-SONET framer 203-1, which receives a packet, inserts it into a SONET frame, producing a 2.5 gigabit/second datastream or parallel bus equivalent, and sends that frame to OC192 add/drop multiplexer 202. Multiplexer 202 combines four 2.5 gigabit/second streams from POS framers 203-1 through 203-4, multiplexes them together into a 10 gigabit/second datastream, and delivers them to optical transceiver 201. Transceiver 201 receives the 10 gigabit/second stream, which is formatted as a parallel bus, and multiplexes it into a single datastream, which modulates a laser diode. This produces a SONET ten-gigabit/second optical format, which is transmitted through outbound optical facility interface link 102-0W.

FIG. 3 is a block diagram illustrating information flow through a typical packet forwarding module 13-0 (18-0). Facility ASICs 301-1 through 301-4 on the ingress side receive packets from facility modules working and protect 11-0W and 11-0P through single links 103-0W0 through 103-0W3. A principal function of facility ASICs 301-1 through 301-4 on the ingress side is to select between the working and the protection facility modules, as represented by the information on, for example, incoming path 103-0W0 or 103-0P0. That selection is made based on the standard SONET criteria for defining if one or both of those incoming facility modules is flawed or failed and also based on any detection of local errors or failures on working facility module 11-0W or protect facility module 11-0P.

In the egress direction, a principal function of facility ASICs 301-1 through 301-4 is to duplicate the packet stream coming out of egress ASIC 302 and to send that packet stream out across both outgoing paths 104-0W0 and 104-0P0 to facility modules 12-0W and 12-0P (see FIG. 2).

Packet forwarding engines 306-1 through 306-4 are devices that inspect the packet headers of all of the incoming packets received on any of the selected working or protect facility modules that are associated with this particular packet forwarding module 13-0 (18-0). Based on the inspection of those headers, a determination of the intended destination of each packet can be made. The header information is stored by an ingress ASIC 304 in various queues and lists, which are used to determine for any given packet which output port of the router it should exit, when it should exit, and its relative priority. Actual packet data is stored by ingress ASIC 304 in an external RAM memory 305. Packet forwarding engine 306-1 through 306-4 also determines if any particular packet is intended for a local destination within this particular router and redirects it toward the main control processor of the router instead of transmitting it downstream out one of the output ports of the router to a peer router across the network.

Ingress ASIC 304, based on the states of the various queues that it maintains and based on the destination addresses of the various packets that are represented by headers in those queues, sends requests through optical transceiver units 308-W and 308-P across optical link 310 (typically multimode ribbon fiber) to the central arbiter (not shown in FIG. 3). The central arbiter determines, based on all of the packets that are being processed through the router in aggregate at any given time, which of the requests from a particular ingress ASIC should be granted and when it should be granted for transmission across the optical switch. Grants of those requests return across optical link 310 through transceivers 308-W and 308-P back to ingress ASIC 304. Ingress ASIC 304 uses that grant information to extract packets from memory 305 in the appropriate order and assembles them into chunk payloads. At the appropriate times ingress ASIC 304 sends those chunk payloads across channels 107-00 through 107-03 to internal optics modules 14-0W0 through 14-NW1 (see FIG. 1B).

On the egress side, information chunk payloads are received from the optical switch matrix indirectly through internal optics modules 17-0W0 through 17-NW1 (see FIG. 1B) across links 108-00 through 108-03 into an egress ASIC 302. Egress ASIC 302 reconfigures the chunks into packets and again stores the packets in a memory 303 in the form of queues and structures. Egress ASIC 302 subsequently reads those packets out again into one of the four facility ASICs 301-1 through 301-4. At the facility ASIC, each of those packet streams is duplicated and sent in tandem to both working and protect facility modules 12-0W and 12-0P.

A line control processor 307 is primarily responsible for controlling the facility protection switching function by examining the SONET error and failure indications from facility modules 11-0W and 11-0P and also by analyzing the indications that facility ASICs 301-1 through 301-4 develop from those incoming signals. The appropriate switching decisions are made in software and logic and are then implemented by line control processor 307.

Figure 4:
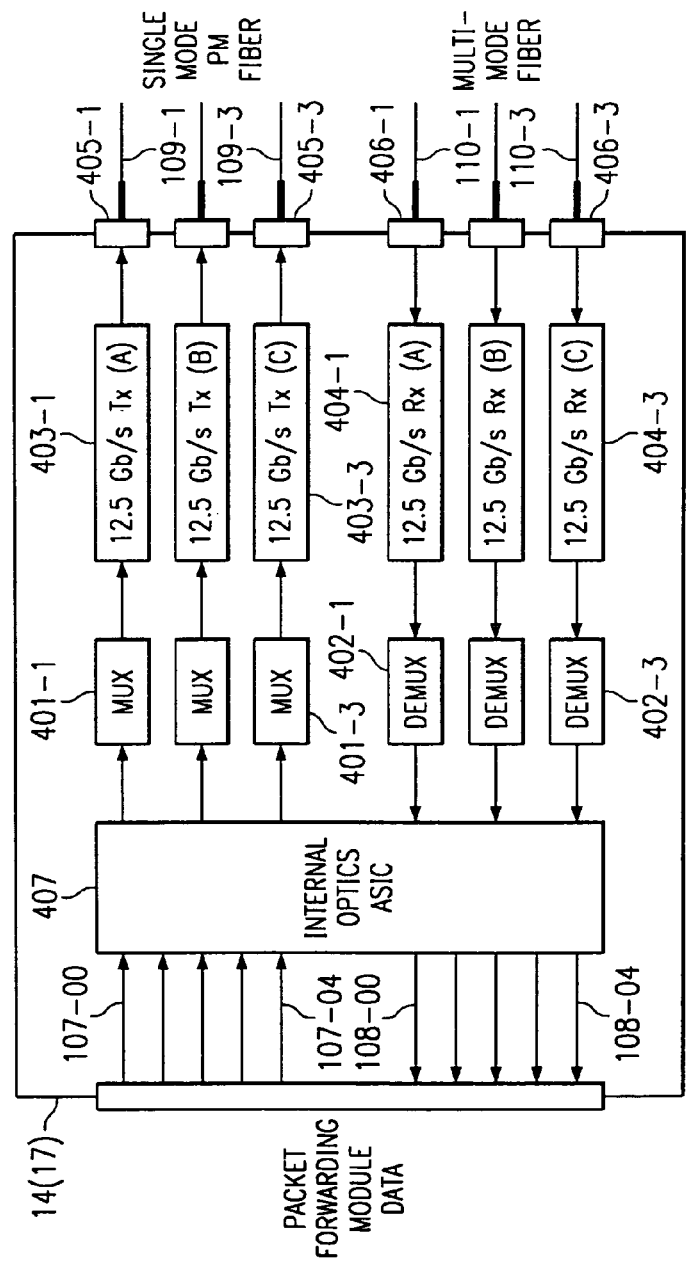
FIG. 4 is a block diagram representing information flow through a typical internal optics module, according to an embodiment of the present invention.

FIG. 4 is a block diagram representing information flow through a typical internal optics module 14 (17), according to an embodiment of the present invention. Internal optics module 14 receives chunk payloads of data via input links 107-00 through 107-04 from packet forwarding modules 13-0 through 13-N (see FIG. 3). An internal optics ASIC 407 selects chunk payloads from those inputs based on grant information that comes back from the central arbiter through each packet forwarding module 13-0 through 13-N. Internal optics ASIC 407 selects which inputs 107-00 through 107-04 will be passed at any point in time to three MUXs 401-1 through 401-3 and out through three 12.5-gigabit-per-second transmitters 403-1 through 403-3 toward the optical switch modules over single mode optical fiber links 109-1 through 109-3. Internal optics ASIC 407 is responsible for encapsulating the chunk payloads with the forward error correcting (FEC) headers and check sums that guarantee that the chunks pass across the optical switch without error, or that if errors occur, they are either corrected or detected. MUXs 401-1 through 401-3 convert input parallel format data to higher bit rate serial data.

In the egress direction in FIG. 4, optical signals coming in over multimode optical fiber links 110-1 through 110-3 pass through 12.5-gigabit-per-second receivers 404-1 through 404-3 and into three DEMUXs 402-1 through 402-3. Receivers 404-1 through 404-3 convert the data chunks from optical to electrical bits and DEMUXs 402-1 through 402-3 convert these from a serial bit stream to lower bit rate parallel bit streams. Internal optics ASIC 407 compares the calculated FEC (forward error correction) check sums with the encoded check sums and determines if any errors have occurred across the switch matrix, corrects those errors if possible, and if not, provides alarm and performance monitoring information based on those errors. Internal optics ASIC 407 then strips away the FEC coding from the chunks and passes the resulting chunk payloads from the demux channels out through links 108-00 through 108-04 to packet forwarding modules 18-0 through 18-N.

In the egress direction, chunk payloads received from internal optics modules 17 are broken down into their original packets by egress ASIC 302 (see FIG. 3). The packets are stored in memory 303 and are then retrieved and delivered at the appropriate time to facility modules 12-0W and 12-0P. Each packet forwarding module 13 packages chunk payloads as described earlier and sends identical streams of chunk payloads to both working 1 and working 0 copies of the optical fabric via internal optics modules (IOMs) 14-0W0 through 14-NW1 (see FIG. 1B). Working 0 copy of the optical switch fabric includes internal optics modules 14-0W0 and 14-1W0, optical switch modules 15-1 through 15-6, and internal optics modules 17-0W0 and 17-1W0, whereas working 1 copy of the optical switch fabric includes internal optics modules 14-0W1 and 14-1W1, optical switch modules 16-1 through 16-6, and internal optics modules 17-0W1 and 17-1W1. For example, IOM 14-0W0 and IOM 14-0W1 each receive simultaneous sequences of chunk payloads from each packet forwarding module 13 that is transmitting through those two IOMs. Similarly, on the egress side each packet forwarding module items 18-0 through 18-N (see FIG. 1C) receives a simultaneous sequence of chunk payloads from IOMs 17-0W0 and 17-0W1, for example. In error-free normal working operation of both optical switch fabrics, the simultaneous sequences of chunk data delivered to each packet forwarding module are identical. In the event of a failure of any kind, either within a chunk or across multiple chunks on either copy zero or copy one of the optical switch fabric, the affected IOM is able to detect that failure based on comparison of the received FEC check sums with the calculated FEC check sums. When a failure on a particular chunk from either working zero or working one copy of the optical switch fabric is detected, the IOM inserts a failure indication downstream toward PFMs 18. This forces PFM 18 to select the error-free chunk data from the alternate copy of the optical switch fabric. This can be done individually for each chunk payload delivered to a particular PFM.

Referring again to FIG. 3, each packet forwarding module 13 packages chunk payloads as described earlier and sends identical streams of chunk payloads to both working 1 and working 0 copies of the optical switch fabric via internal optics modules (IOMs) 14-0W0 through 14-NW1 (see FIG. 1B), which encapsulates the chunk payloads into chunks. Working 0 copy of the optical switch fabric (see FIG. 1B) includes internal optics modules 14-0W0 and 14-1W0, optical switch modules 15-1 through 15-6, and internal optics modules 17-0W0 and 17-1W0, whereas working 1 copy of the optical switch fabric includes internal optics modules 14-0W1 and 14-1W1, optical switch modules 16-1 through 16-6, and internal optics modules 17-0W1 and 17-1W1. For example, IOM 14-0W0 and IOM 14-0W1 each receive simultaneous sequences of chunk payloads from each packet forwarding module 13 that is transmitting through those two IOMs. Similarly, on the egress side each packet forwarding module 18-0 through 18-N (see FIG. 1C) receives a simultaneous sequence of chunk payloads from IOMs 17-0W0 and 17-0W1, for example. In error-free normal working operation of both optical switch fabrics, the simultaneous sequences of chunk data delivered to each packet forwarding module are identical. In the event of a failure of any kind, either within a chunk or across multiple chunks on either copy zero or copy one of the optical switch fabric, the affected IOM is able to detect that failure based on comparison of the received FEC check sums with the calculated FEC check sums. When a failure on a particular chunk from either working zero or working one copy of the optical switch fabric is detected, the IOM inserts a failure indication downstream toward PFMs 18. This forces PFM 18 to select the error-free chunk data from the alternate copy of the optical switch fabric. This can be done individually for each chunk payload delivered to a particular PFM.

Referring again to FIG. 4, internal optics ASIC 407 detects any errors or failures of a given chunk on either copy zero or copy one of the switch fabric and inserts appropriate failure indications downstream toward all of the packet forwarding modules connected to it.

Referring again to FIG. 3, egress ASIC 302 receives those failure indications and selects on a chunk by chunk basis between either the copy zero or the copy one switch fabric. Only error-free chunk payloads from an unfailed switch fabric are inserted into memory and subsequently retrieved and broken out into packets, which are then transmitted toward facility modules 12-0W and 12-0P.

Figure 5:
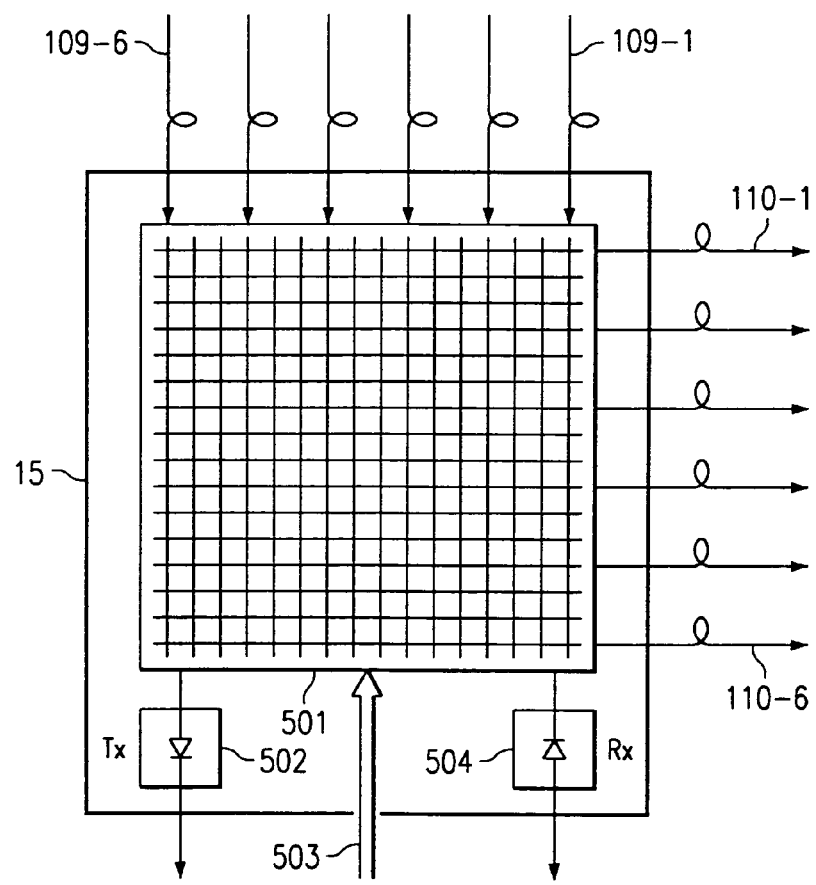
FIG. 5 is a simplified schematic diagram illustrating a method of fault isolation and diagnostics in a switch fabric, in accordance with embodiments of the present invention.

FIG. 5 is a simplified schematic diagram illustrating a method of fault isolation and diagnostics in a switch fabric, in accordance with embodiments of the present invention. An optical switch fabric 501 in an optical switch module 15 is interconnected through optical links 109-1 through 109-6 with internal optics module 14 (see FIG. 4) on the ingress side and through optical links 110-1 through 110-6 with internal optics module 17 on the egress side. Control and timing signals are received by optical switch module 15 through control and timing links 503. Also contained in optical switch module 15 are an optical transmitter 502 interconnected with optical switch fabric 501 on the ingress side and an optical receiver 504 interconnected with optical switch fabric 501 on the egress side.

The fault isolation and diagnostic method is initiated by launching a non-traffic-bearing data chunk from optical transmitter 502 on a predetermined data path through optical switch fabric 501 and then detecting and receiving the data chunk at optical receiver 504. The received data chunk is then examined according to predetermined criteria. If the non-traffic-bearing data chunk satisfies these criteria, then the predetermined data path is error-free. However, if the non-traffic-bearing data chunk fails to satisfy these criteria, then that predetermined data path is faulty. The predetermined criteria typically include forward error correction criteria, although other error checking criteria can be used.

The method of fault isolation and diagnostics illustrated in FIG. 5 can be applied to multiple duplicated switch fabrics. The non-traffic-bearing data chunk is first encoded with forward error correction or other appropriate coding prior to being launched through the optical switch fabric. The non-traffic-bearing chunk can not only be launched and detected within the optical switch module, but alternatively within other modules, for example internal optics modules. The launch site and receiving site can be on the same or different modules. The method can be applied to non-optical switch fabrics as well.

Note that while embodiments of the invention have been described in terms of two SONET standards namely OC48 and OC192, alternative implementations of router 10 having an appropriate facility module can operate under other standards.

Embodiments according to the present invention are designed to protect against all single fault occurrences. Single faults include a single fault of a module, a single fault of a cable, or a single fault of a path. Accordingly, although some double faults are protected against, double faults generally lie beyond the scope of principal objects of the present invention and thus are not in general protected against.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    launching an aggregation packet from a first module within a switch fabric, wherein the aggregation packet includes a plurality of Internet Protocol (IP) packets and indicates an ingress address assigned to an ingress module and an egress address assigned to an egress module;
    receiving said aggregation packet at a second module within the switch fabric;
    comparing the ingress address with the address of the first module;
    comparing the egress address with the address of the second module;
    responsive to the ingress address not being consistent with the address of the first module or the egress address not being consistent with the address of the second module, determining a data path through the switch fabric to be faulty; and
    launching a duplicate copy of the aggregation packet from a protection module corresponding to the first module.

2. The method of claim 1, further comprising receiving a duplicate copy of the aggregation packet at a protection module corresponding to the second module.

3. The method of claim 1, further comprising diverting aggregation packets to be launched via the first module to a protection module, thereby allowing the first module to be replaced.

4. The method of claim 1, further comprising performing error correction and detection.

5. The method of claim 4 wherein said error correction and detection is forward error correction.

6. The method of claim 1, further comprising reframing the aggregation packet prior to the aggregation packet entering the switch fabric.

7. The method of claim 1 wherein said data path comprises an optical fiber cable.

8. The method of claim 1 wherein said aggregation packet is a substantially fixed size diagnostic chunk.

9. The method of claim 1 wherein said switch fabric, said first module, and said second module are incorporated within a router system.

10. A system, comprising:
- a first module comprising hardware and within a switch fabric, the first module configured to launch an aggregation packet, wherein the aggregation packet includes a plurality of IP packets and indicates an ingress address assigned to an ingress module and an egress address assigned to an egress module;
- a second module within the switch fabric to receive said aggregation packet;
- a comparison mechanism within the switch fabric and configured to:
  - compare the ingress address with the address of the first module;
  - compare the egress address with the address of the second module; and
- a fault detection mechanism configured to determine a data path through the switch fabric to be faulty responsive to the ingress address not being consistent with the address of the first module or the egress address not being consistent with the address of the second module; and
- a protection module corresponding to the first module, the protection module configured to launch a duplicate copy of the aggregation packet.

11. The system of claim 10, further comprising a protection module corresponding to the second module, the protection module configured to receive a duplicate copy of the aggregation packet.

12. The system of claim 10, further comprising an error correction and detection mechanism configured to perform error correction or detection or both.

13. The system of claim 12, wherein said error correction is forward error correction.

14. The system of claim 10, further comprising a protection mechanism configured to divert aggregation packets to be launched via the first module to a protection module, thereby allowing the first module to be replaced.

15. The switch of claim 10, wherein said data path comprises an optical fiber cable.

16. The switch of claim 10, wherein said aggregation packet is a substantially fixed size diagnostic chunk.

17. The switch of claim 10, wherein said switch fabric, said first module, and said second module are incorporated within a router system.

* * * * *